United States Patent
Desjardins et al.

(10) Patent No.: US 8,457,291 B1
(45) Date of Patent: Jun. 4, 2013

(54) UNIVERSAL TARGET BUTTON

(75) Inventors: Tom Desjardins, Lucas, TX (US);
Edward Leonhardt, Erie, CO (US);
Henry Chen, Plano, TX (US); Eric K. Weeren, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 1202 days.

(21) Appl. No.: 12/115,932

(22) Filed: May 6, 2008

(51) Int. Cl.
*H04M 1/00* (2006.01)
*H04M 9/00* (2006.01)

(52) U.S. Cl.
USPC .................................. 379/156; 379/433.06

(58) Field of Classification Search
USPC ........... 379/156, 164, 216.01, 355.01, 433.06
See application file for complete search history.

(56) References Cited

U.S. PATENT DOCUMENTS

| | | | | | |
|---|---|---|---|---|---|
| 4,788,720 | A | * | 11/1988 | Brennan et al. | 379/201.04 |
| 5,892,813 | A | * | 4/1999 | Morin et al. | 379/88.01 |
| 7,526,081 | B1 | * | 4/2009 | Vashisht et al. | 379/433.06 |
| 7,529,358 | B2 | * | 5/2009 | Tankhiwale | 379/201.03 |
| 7,616,761 | B1 | * | 11/2009 | Sin | 379/433.07 |
| 2008/0069325 | A1 | * | 3/2008 | King | 379/157 |

* cited by examiner

*Primary Examiner* — Quoc D Tran
(74) *Attorney, Agent, or Firm* — Patent Capital Group

(57) ABSTRACT

In one embodiment, an apparatus is disclosed which comprises a status sensitive input related to a programmed telephone number for conveying a control signal to a controller of a telephone to initiate a function; a detector for determining a status of the telephone and conveying the status to the controller of the telephone; wherein the function initiated by the controller is chosen from two or more functions dependent upon the status of the telephone as determined by the detector.

21 Claims, 5 Drawing Sheets

UNIVERSAL TARGET BUTTON

TECHNICAL FIELD OF THE INVENTION

The present disclosure relates generally to telephone keypad consoles and more particularly to functional programming of the keypad.

BACKGROUND

Modern telephone systems, particularly those used in a business environment are frequently used to perform many functions. For example, call diversion, call transfer, conference calls and message storage. As a result of the burgeoning number of functions now considered essential by the user, the average number of logical or physical buttons on a telephone console is increasing. This results in a telephone console that is cumbersome, confusing and not easy to use. Buttons preprogrammed with a specific number for speed dialing reduces the keystrokes required to place a simple call. However, functions such as call diversion and call transfer still commonly require the entry of a sequence of several keystrokes and the use of several different buttons.

DESCRIPTION OF EXAMPLE EMBODIMENTS

Overview

Figure 1:
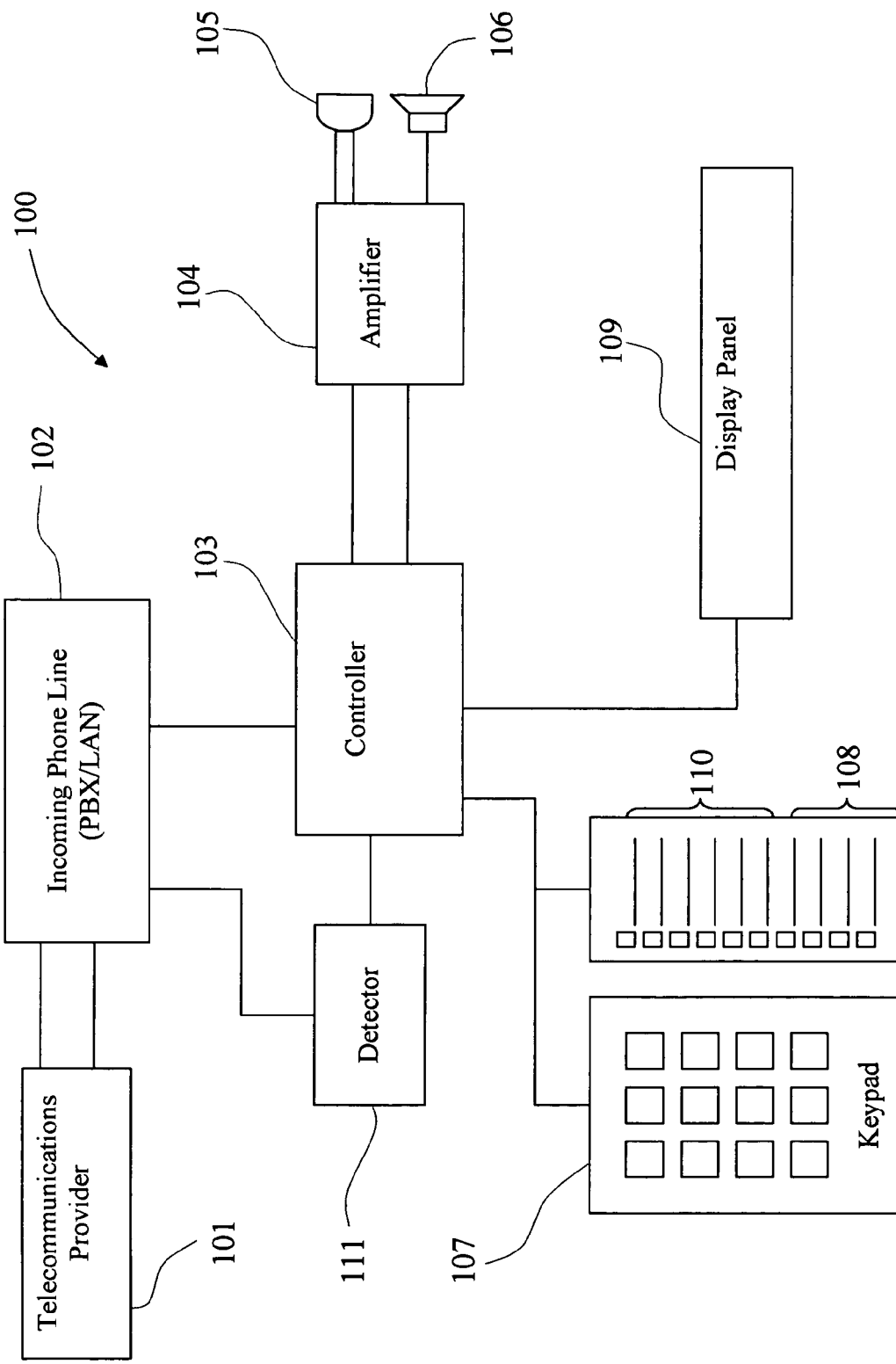
FIG. 1 illustrates a block diagram of a telephone.

Embodiments described herein comprise a status sensitive input related to a programmed telephone number for conveying a control signal to a controller of a telephone (land line or mobile). A telephone with the status sensitive input includes a status detector that determines if the telephone is on-hook, off-hook, or transitions from off-hook to on-hook. The detector communicates the status to the controller that, on receipt of the control signal from the status sensitive input initiates a function related to the programmed telephone number chosen from two or more functions dependent upon the status of the telephone.

The embodiments will now be described with reference to the drawings, wherein like reference numerals are used to refer to like elements throughout. For ease of description, reference may be made to calls to or from an "outside line". Reference to an outside line is for convenience only and it will be understood that the embodiments may apply to calls between telephones within a local phone network.

A standard telephone system controls a group of connected or related telephones. A typical telephone as described below provides the environment in which the status sensitive inputs of the embodiments are found.

Referring to FIG. 1, there is shown a block diagram of a typical telephone 100 connected to a telecommunications provider 101. The incoming signal is directed by an incoming phone line 102, processed by suitable circuitry in a controller 103 and directed to an amplifier 104. The amplifier 104 converts the signal to sound which is directed to an earpiece speaker 105 in a conventional telephone handset or other speakers for hands free use. Similarly, speech from a user is detected by a mouthpiece microphone 106 in the telephone handset and converted to an electronic signal by the amplifier 104. The outgoing signal is then directed to the controller 103, which directs it via the phone line 102 to the telecommunications provider 101.

A detector 111 is connected to the incoming phone line 102 to detect the status of the telephone 100. The detector 111 determines if the telephone is not in use, off-hook, connected to an outside line or if there is an incoming call. The determination of status is then directed to the controller 103.

The telecommunications provider 101 is connected to the telephone via a local area network (LAN) connection through a computer, or via a private branch exchange (PBX) or key telephone system (KTS). Telephones connected to a computer usually contain few internal components, as the majority of functions and control is managed by the computer and LAN. Telephones connected to a PBX or KTS contain standard telephone components such as dial circuits, ring detectors and line matching circuitry.

The telephone 100 includes a keypad 107 for directing user input to the controller 103, and a display 109 for providing visual feedback of the functions being performed by the telephone 100. The keypad 107 includes a standard twelve button key set (0-9,*,#). Additionally the telephone 100 may include one or more conventional function buttons 108 and includes one or more status sensitive inputs 110. In one embodiment, the function buttons 108 and the status sensitive inputs 110 are linked by the controller 103 to the display 109 for visually indicating the function of each button. These functions may include auto dialing, redialing, call forwarding, voice messaging and others, as described below.

The keypad 107, function buttons 108 and status sensitive inputs 110 may be in the form of a conventional physical buttons on a telephone console, or alternatively may be in the form of logical buttons. For example, where a picture of a physical button is depicted on a computer screen for a VoIP phone. The input 110 may also be voice activated or a virtual button displayed on a touch screen.

Optionally, the status sensitive input is provided with a target status detector for determining a status of a telephone associated with the programmed telephone number related to the status sensitive input. Once determined by the target status detector, the information regarding the status is conveyed to a status indicator. The status indicator shows the user of the telephone the status of the telephone associated with the programmed telephone number of the status sensitive input. In one embodiment, the status indicator takes the form of a light which is off if the target telephone is inactive, flashing if the target telephone is active but not in use (such as call diversion function active, do-not-disturb function active) and steady on if the target telephone is active and in use (such as connected to a call). Alternatively, the status indicator may take the form of different colours of lights depending on the status detected or, if the status sensitive inputs are displayed on an LCD screen, appropriate symbols may be displayed on the screen depending on the status detected.

The status indicator allows the user to identify the status of the target telephone and thus the user may be assisted in their choice of target telephone.

In one embodiment a status sensitive input 110 is linked to a programmed telephone number and set of contextual functions rather than simply a single function. The function initiated by pressing the button is determined by the status of the telephone at the time it is pressed. As the telephone system determines which function to carry out by detecting the current status of the telephone, the user is not required to input the function operation. Thus the number of button pushes required is reduced. Additionally, the provision of a multitude of function buttons may be reduced or even eliminated, thus freeing up valuable button real estate. The resulting telephone is less visually confusing and easier to use. This functionality is discussed further below.

Figure 2:
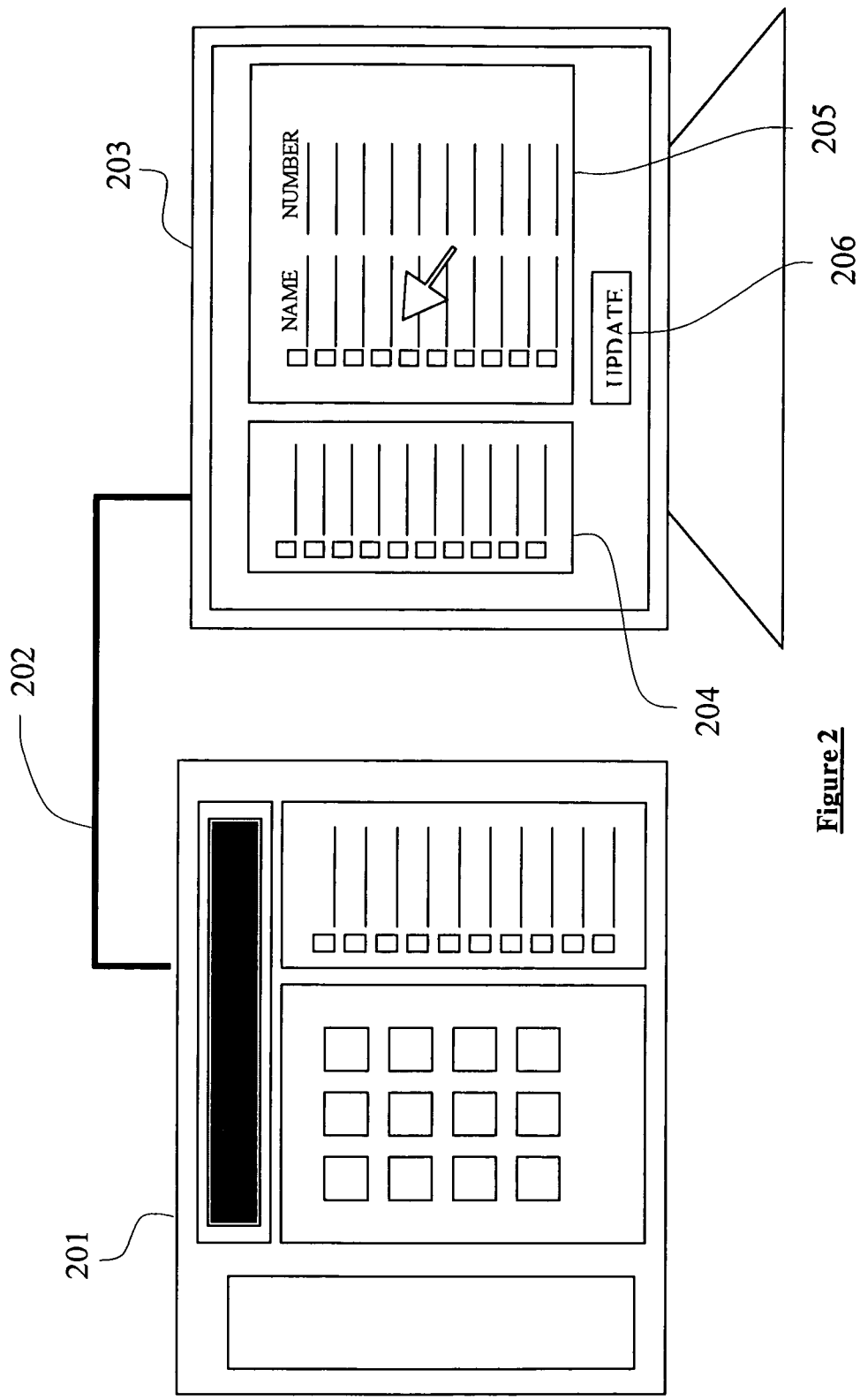
FIG. 2 illustrates a telephone connected to a computer

Programming of the status sensitive inputs 110 may be undertaken by following a series of steps using the keypad 107, following visual prompts given by the display 109. Alternatively, as shown in FIG. 2, if the telephone 201 is connected to a computer 203, appropriate software may be used to program the status sensitive inputs online 204, and then download the information to the telephone 201. For example, to add a new status sensitive input, the user opens the software on the connected computer 203 and navigates to the configuration page. A listing of the status sensitive inputs 205, with their associated names and phone numbers may be edited, added to or deleted, and then the updated listing downloaded to the phone by clicking an UPDATE button 206 to make the change active.

Alternatively, the user accesses a web page provided by the PBX or KTS system. The web page allows the user to program the status sensitive inputs and on completion of the programming, the information is downloaded by the PBX or KTS system to all connected telephones. The method is of particular use for programming all telephones of an organization. Additionally, a combination of global programming of a whole PBX/KTS system and individual programming of a particular telephone may be used.

Figure 3:
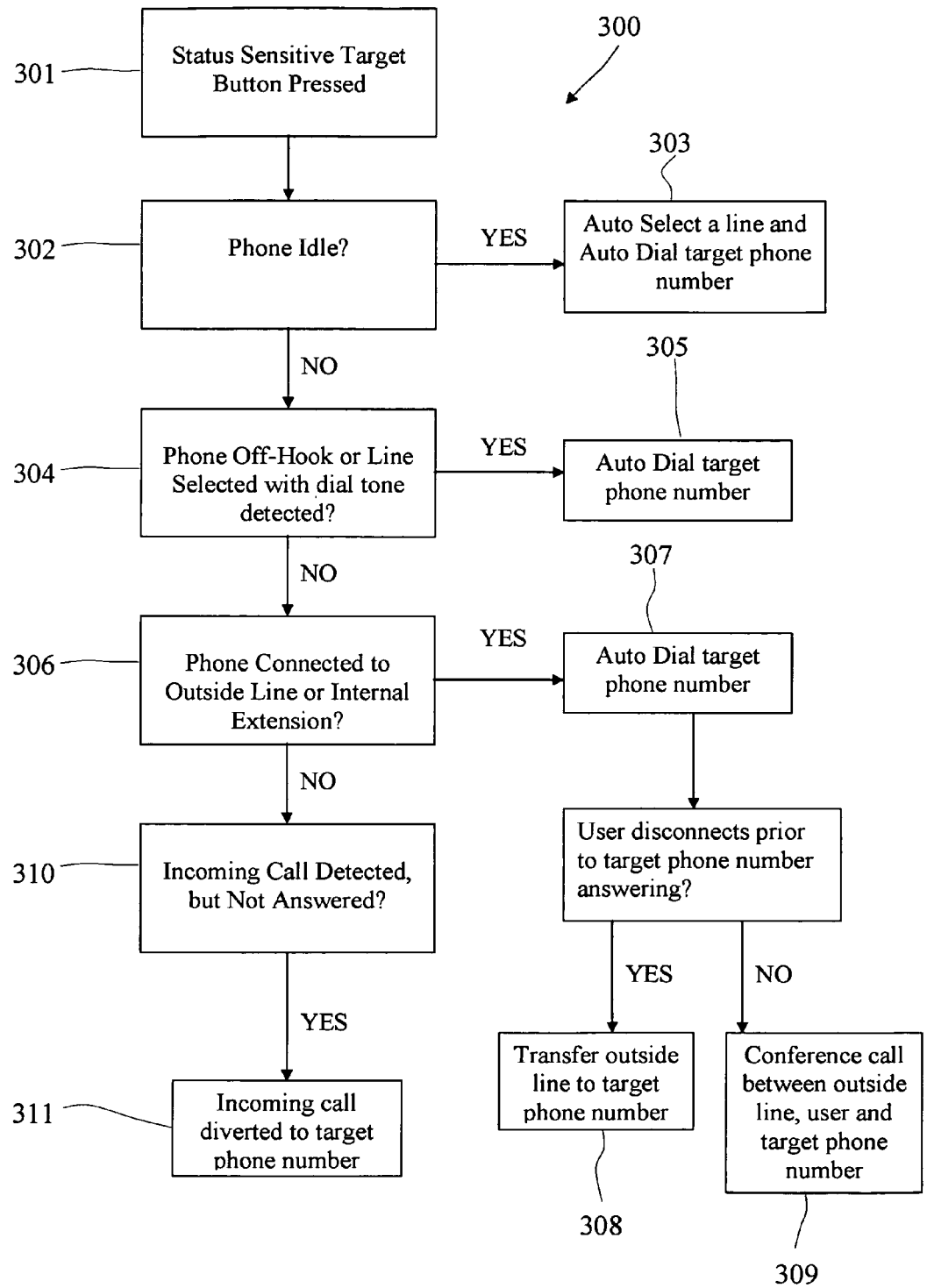
FIG. 3 illustrates a flow diagram for the functionality associated with a status sensitive input.

The flowchart 300 of FIG. 3 illustrates some functionality options for the status sensitive inputs 110. When a status sensitive input 110 is pressed 301, the detector 111 determines if the phone is not in use 302 and signals the controller 103. If so, an outside line is selected and the programmed telephone number associated with the status sensitive input is automatically dialed 303. If the phone is in use, the detector 111 determines if the phone is off the hook or an outside line is selected 304. If so, the controller 103 automatically dials the programmed telephone number 305.

If the detector 111 determines that the phone is connected to an outside line 306, and the user presses the status sensitive input 110, a second call is placed by the controller 103 to the programmed phone number 307. If the user disconnects before the target party answers, the detector 111 determines that the user has disconnected and connects the outside line to the programmed phone number and the call is transferred 308. If, however, the phone is connected to a line 306 and the user presses the status sensitive input 110 and does not disconnect before the target party answers, a conference call ensues between the user, the line and the programmed telephone number 309. The choice between a conference call and a transfer of the outside line to the programmed phone number is dependent upon whether the detector detects an on-hook event (user disconnecting) prior to the target party answering the second call.

If the detector 111 detects that there is an incoming call in an alerting state 310, the incoming call is diverted by the controller 103 to the programmed phone number 311 when the status sensitive input 110 is pressed. The telephone can be in any state, (on hook, off hook, on an active call) when the alerting state occurs and the status sensitive input and controller will act accordingly.

Figure 4:
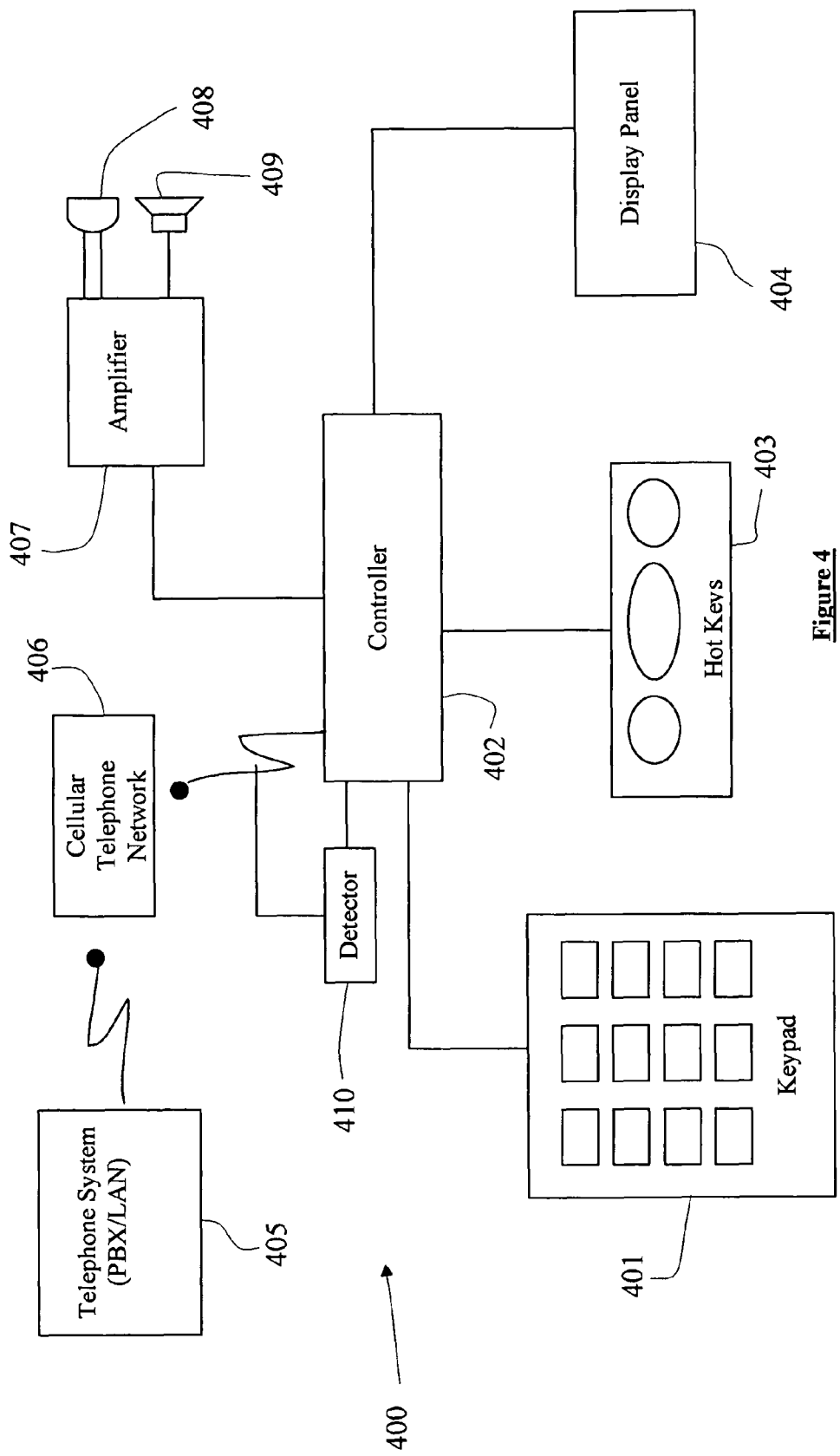
FIG. 4 illustrates a block diagram of a mobile telephone

The use of inputs that have status sensitive functionality may be extended to mobile phone technology. Referring to FIG. 4, there is shown a simple block diagram of a telephone that is mobile 400. The mobile telephone 400 connects wirelessly via a cellular telephone network 406 to a phone system such as a PBX or LAN 405. The incoming signal from the cellular telephone network 406 is processed by suitable circuitry in the controller 402 and directed through an amplifier 407 to an earpiece speaker 408 in a conventional mobile telephone handset. Similarly, speech from a user is detected by a mouthpiece microphone 409 in the mobile telephone handset and converted to an electronic signal by the amplifier 407. The outgoing signal is then directed to the controller 402, which directs it via the cellular telephone network 406 to telephone system 405.

A detector 410 is connected to the cellular telephone network connection 406 to detect the status of the mobile telephone 400. The detector 410 determines if the mobile telephone is not in use, off-hook, connected to an outside line or if there is an incoming call. The determination of status is then directed to the controller 402.

The mobile telephone 400 includes a standard twelve button key set (0-9,*, #) keypad 401 for directing user input to a controller 402, and a display 404 for providing visual feedback of the actions being performed by the telephone 400. The mobile telephone 400 may additionally have one or more hot keys 403. Alternatively, the standard twelve button key set 401 may additionally function as hot keys 403. The hot keys 403 and/or keypad 401 are linked by the controller 402 to the display 404 for visually indicating the function of each key. These functions may include auto dialing, redialing, call forwarding, conference calling, voice messaging and others.

The keypad 401 may alternatively take the form of a virtual keypad on the display 404, wherein a stylus is used to select each key (not shown).

Buttons on the keypad 401 or virtual keypad may be programmed as inputs that have status sensitive functionality.

In a further embodiment, voice recognition software may be used such that the user depresses a hot key 403 or keypad button 401 and speaks a name of a programmed target. For example, press "target" and say "Sarah". The detector 410 determines the status of the telephone and therefore the function that follows in similar manner to as described above.

Figure 5:
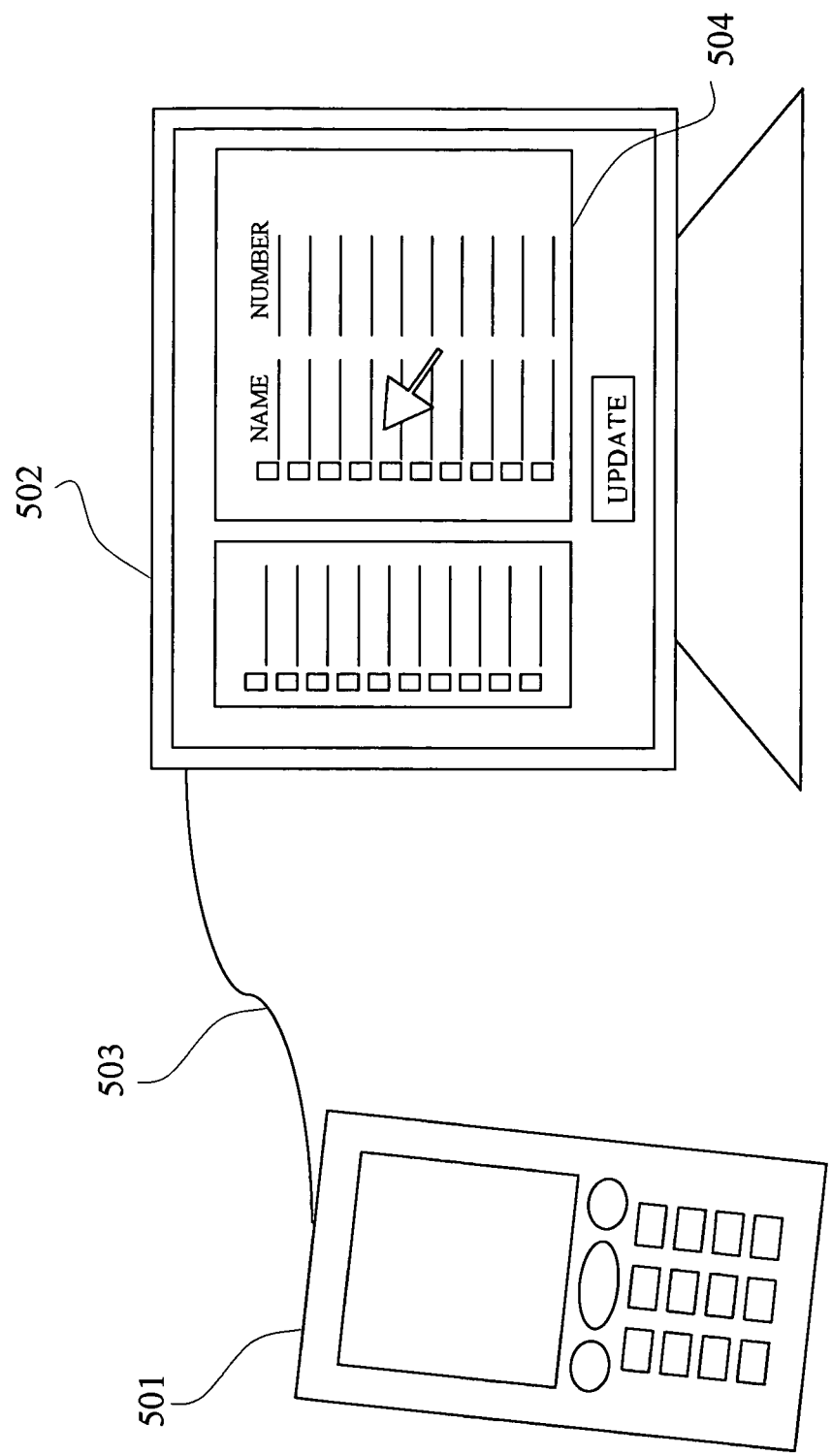
FIG. 5 illustrates a mobile telephone connected to a computer

Programming of the hot keys 403 and/or keypad 401 may be undertaken in a similar way to described above, either by following a series of steps using the keypad 401 or alternatively, as shown in FIG. 5, wherein the mobile telephone 501 is connected to a computer 502. The connection 503 may take the form of a physical cable or a wireless connection. When the mobile telephone 501 is connected to a computer 502, appropriate software may be used to program the status sensitive inputs online, and then download the information to the telephone. For example, to add a new status sensitive input, the user opens the software on the connected computer 502 and navigates to the configuration page. A listing of the inputs 504, with their associated names and phone numbers may be edited, added to or deleted, and then the updated listing downloaded to the mobile telephone 501.

The functionality of the input is determined by the status of the telephone at the time it is used. The status is determined by the detector 410 in a similar fashion to that described above in relation to FIG. 3.

Advantages of embodiments described herein thus include increased functionality of telephones without increased complexity and greater range of functionality without additional telephone buttons. Furthermore, existing functionality is maintained with enhanced usability.

The invention claimed is:

1. An apparatus comprising:
   a status sensitive input related to a programmed telephone number for conveying a control signal to a controller of a telephone to initiate a function; and
   a detector configured for:

determining a status of the telephone as being in use, off-hook, or as receiving an incoming call, and conveying the status to the controller of the telephone, wherein the function initiated by the controller is chosen based on the status of the telephone, and initiated without requiring input from the user of the telephone.

2. The apparatus of claim 1 wherein the status sensitive input is a button activatable by a user.

3. The apparatus of claim 1 wherein the status sensitive input is voice activated.

4. The apparatus of claim 1 wherein the status sensitive input is a virtual button displayed on a touch screen.

5. The apparatus of claim 1 wherein the telephone is a desktop telephone handset or a mobile telephone handset.

6. The apparatus of claim 1 further comprising a connection to a private branch exchange (PBX) system.

7. The apparatus of claim 6 wherein the status sensitive input of the telephone is programmed by accessing a web page linked to the PBX system.

8. The apparatus of claim 1 further comprising a connection to a local area network (LAN) system.

9. The apparatus of claim 8 wherein the status sensitive input of the telephone is programmed by a software program of a computer connected to the LAN system.

10. The apparatus of claim 1 further comprising a target status detector for determining a status of a telephone associated with the programmed telephone number related to the status sensitive input.

11. The apparatus of claim 10 further comprising a status indicator for displaying the status of a telephone associated with the programmed telephone number related to the status sensitive input as determined by the target status detector.

12. The apparatus of claim 11, wherein the status indicator is a light or a picture on a liquid crystal display screen.

13. A method of operating a telephone comprising:
receiving a status sensitive input to activate a function related to a programmed telephone number;
determining a status of the telephone as being in use, off-hook, or as receiving an incoming call; and
initiating the function for the programmed telephone number, wherein the function is chosen based on the status of the telephone, and initiated without requiring input from the user of the telephone.

14. The method of claim 13 wherein the status of the telephone is determined by a detector.

15. The method of claim 13 wherein a function of dialing the programmed telephone number of the status sensitive input is chosen when the telephone is determined to be not in use or off-hook.

16. The method of claim 13 wherein a function of transferring a line to the programmed telephone number of the status sensitive input is chosen when the telephone is determined to be connected to the line and the telephone is disconnected after receiving the status sensitive input.

17. The method of claim 13 wherein when the telephone is determined to be connected to an outside line and the telephone remains connected after the status sensitive input is received, a function of a conference call between the outside line, the telephone and the programmed phone number of the status sensitive input is chosen.

18. The method of claim 13 wherein when the telephone is determined to be receiving an incoming call, receiving the status sensitive input chooses the function of diverting the incoming call to the programmed telephone number of the status sensitive input.

19. An apparatus comprising:
means for receiving a status sensitive input to activate a function related to a programmed telephone number;
means for determining a status of the telephone as being in use, off-hook, or as receiving an incoming call; and
means for initiating the function for the programmed telephone number, wherein the function is chosen based on the status of the telephone, and initiated without requiring input from the user of the telephone.

20. The apparatus of claim 19 further comprising means for determining a status of a telephone associated with the programmed telephone number of the status sensitive input.

21. The apparatus of claim 19 further comprising means for indicating the status of a telephone associated with the programmed telephone number of the status sensitive input.

* * * * *